Patented Jan. 15, 1952

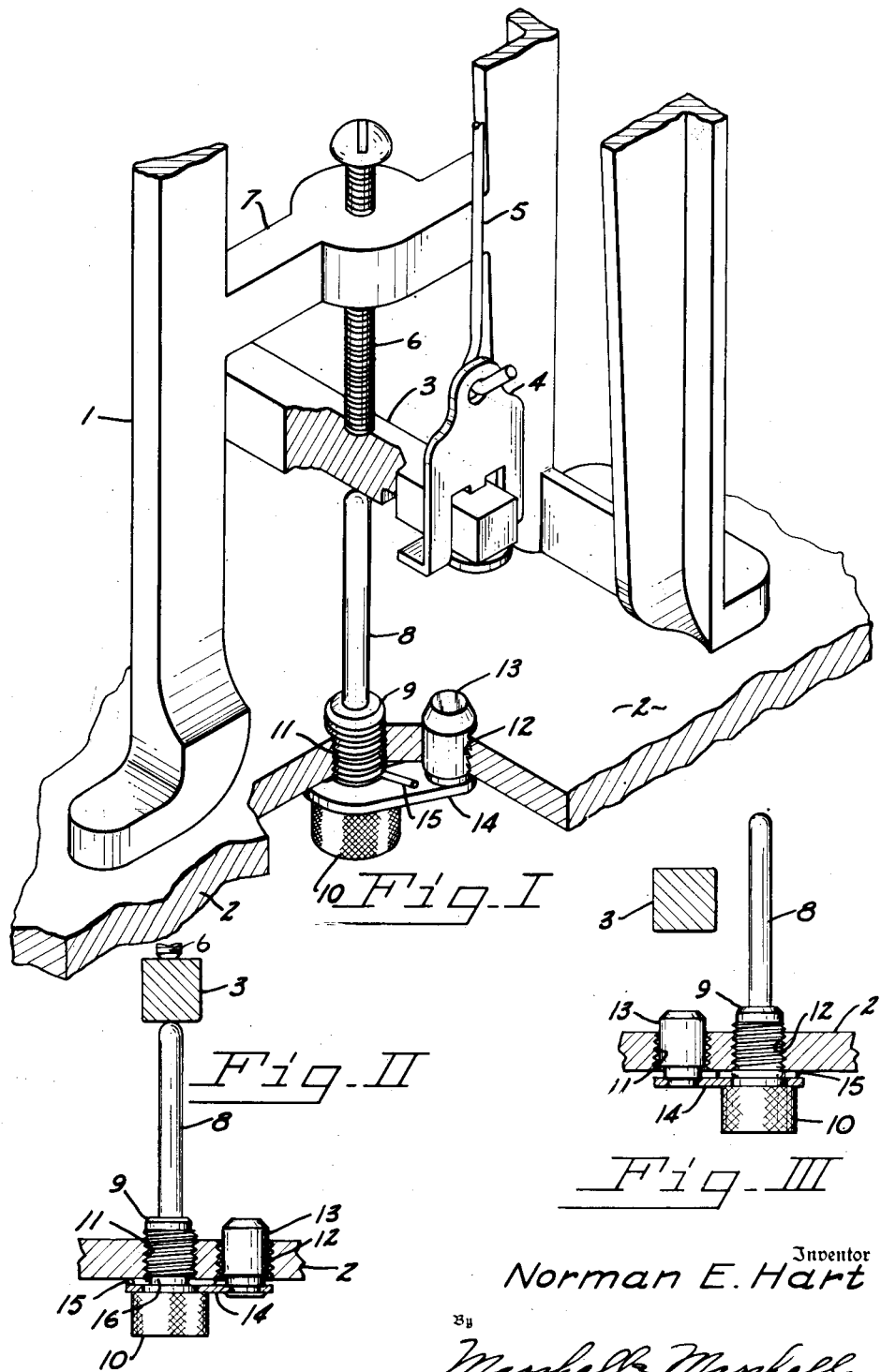

2,582,484

UNITED STATES PATENT OFFICE 2,582,484

LEVER LOCK

Norman E. Hart, Toledo, Ohio, assignor to Toledo Scale Company, Toledo, Ohio, a corporation of New Jersey Application August 22, 1950, Serial No. 180,822

4 Claims. (Cl. 265—49)

This invention relates to weighing scales and in particular to an improved structure for locking the lever of the scale when the scale is to be shipped or moved from one location to another.

Many devices have been produced and used for locking the lever of the scale when the scale is being shipped. These devices either employed a spring urged member to hold the lever against a fixed stop or they included members that were removed when the scale was unlocked and thus were likely to be lost thereby causing inconvenience if the scale is to be subsequently moved.

The principal object of this invention is to provide a locking mechanism for a weighing scale lever which not only has no resilient members but which also has no parts that may be mislaid or lost.

Another object of this invention is to provide a positive lock for a weighing scale lever which lock may be changed from operative to inoperative position without the use of tools.

More specific objects are apparent from the following description of a preferred embodiment of the invention.

A weighing scale lever lock constructed according to the invention comprises a post having a threaded shank, the post being inserted through a hole in the base of the scale beneath the lever and, when tightened in place, serving to drive the lever against a stop thus holding it securely in position. The base of the scale is provided with a second threaded hole which may receive the threaded post when in its inoperative position, i. e. with the post extending upwardly past the side of the lever. A plug carried on a side arm of the post serves to close that one of the threaded holes not occupied by the post. The bottom end of the post is knurled so that it may be removed or installed without the use of tools.

A preferred embodiment of the invention is illustrated in the accompanying drawings.

In the drawings:

Figure I is a fragmentary isometric view of a portion of the weighing scale showing the improved lock and its cooperation with the lever and the base of the scale.

Figure II is a vertical section showing the cooperation of the lock and lever when the lever is in its locked position.

Figure III is a similar vertical section showing the post in its inoperative position.

These specific figures and accompanying description are intended merely to illustrate the invention but not to impose limitations on its scope.

In a weighing scale embodying the invention a counterbalance support frame 1 is erected from a base 2 in a position extending over the free end of a weighing scale lever 3. The weighing scale lever 3 transmits load force from a load receiver to a stirrup 4 pivotally connected to the lever 3 and supported by a link 5 suspended from a load counterbalancing mechanism. The upward travel of the lever 3 is limited by a screw 6 threaded through a cross member 7 of the frame 1 and the screw is adjusted to stop the lever at a position slightly above the usual no load position of the lever. When it is desired to lock the lever, as for shipping or moving the scale, a post 8 having a threaded shank 9 and a knurled end 10 is threaded through a hole 11 in the base 2 immediately below the lever 3 so that as the post is screwed into position its upper end engages the lever and drives it upwardly against the stop screw 6. This condition is illustrated in Figure II.

When the scale is to be put into service the post 8 is removed from the hole 11 and inserted through another threaded hole 12 so that the post 8 extends upwardly alongside the path of movement of the lever 3. (See Figure III.)

That one of the threaded holes 11 and 12 that is not being occupied by the post 8 is filled by a plug 13 which is carried on an arm 14 rotatably mounted on the post 8 between the threaded shank portion 9 and the knurled head 10. This assembly of post 8, arm 14, and plug 13 form a generally J-shaped assembly that fills both holes 11 and 12. A spring clip 15 is engaged in a groove 16 of the post to hold the arm 14 in position while permitting it to rotate on the post. The plug 13 is of a size to completely fill the threaded hole into which it fits and thus serves to exclude dirt and vermin from the interior of the scale housing. Thus, regardless of whether the scale is being locked for shipment or being conditioned for use the threaded openings 11 and 12 in the base 2 are closed by means of the same structure. Furthermore, there are no parts to be mislaid when the scale is received and set up for use but rather all of the structure is used in either condition and must be placed in proper position to either lock the lever or permit it to operate.

The improved structure for locking a weighing scale lever eliminates all resilient members and makes a very rigid lock making it practically impossible to dislodge the lever from its locked position.

Various modifications may be made in the specific detail of construction without departing from the spirit and scope of the invention.

Having described the invention, I claim:

1. In a weighing scale having a base, a lever fulcrumed on the base, and a stationary frame erected from the base and extending over the movable end of the lever, a lock for the lever comprising a portion of the frame that is in position to engage the upper surface of the lever at its upper limit of travel, a post for supporting the lever in locked position, the post having a threaded shank, said base having a pair of threaded holes one of which is beneath the lever and generally under the frame and the other of which is adjacent the first but not under the lever, each of the holes being adapted to receive the threaded shank of the post, and a plug carried from the threaded shank of the post for closing the hole not occupied by the post.

2. In a weighing scale having a base, a lever fulcrumed on the base, and a stationary frame erected from the base and extending over the movable end of the lever, a lock for the lever comprising a member mounted in the frame in position to engage the upper surface of the lever at its upper limit of travel, said base having a pair of holes in the region generally beneath the lever with one of the holes directly beneath the lever, a J-shaped assembly insertable in the holes and adapted when the long side of the assembly is beneath the lever to force the lever against said member, and means for securing the assembly in position.

3. In a weighing scale having a base, a lever fulcrumed on the base, and a frame erected from the base and extending over the lever, a lock for the lever comprising a generally J-shaped assembly the long side of which is rotatable with respect to the bottom and short side, said base having a pair of threaded holes, one of which is under the lever, and a threaded shank on the long side of the assembly for securing the assembly in the holes in either direct or reversed position, whereby the long side may in direct position force the lever upwardly against said frame and in reversed position permit free movement of the lever.

4. In a weighing scale having a base, a lever fulcrumed on the base, and a frame erected from the base and to extending over the lever, a lock for the lever comprising a generally J-shaped assembly, said assembly having as a long side a threaded post that is insertable through a threaded hole in the base for forcing the lever against the frame or through a second threaded hole serving to hold the post in inactive position, a plug for closing that one of the holes not filled by the post, and a plate that is rotatably mounted on the post for supporting the plug.

NORMAN E. HART.

No references cited.